United States Patent Office 3,542,688
Patented Nov. 24, 1970

3,542,688
FLOCCULANT CONSISTING OF THE CONDENSATION PRODUCT OF A POLYHALOGENATED ORGANOPHOSPHATE AND A POLYAMINE
Leo E. Crowley, Wakefield, Mass., assignor to Amicon Corporation, Lexington, Mass., a corporation of Massachusetts
No Drawing. Filed Apr. 18, 1968, Ser. No. 722,203
Int. Cl. C02b 5/06; C23f 11/16, 14/02
U.S. Cl. 252—180                          7 Claims

ABSTRACT OF THE DISCLOSURE

Novel flocculating agents prepared by the controlled condensation reaction of (1) at least one polyhalogenated phosphorous-bearing compound such as tris β-chloroethylphosphate and (2) a polyamine of the formula

wherein $x$ has an average value from 1 to 6 and $y$ is an integer from 2 to 8. These novel flocculants preferably have average molecular weights of at least 1000 and are most useful in the form of aqueous solutions.

BACKGROUND OF THE INVENTION

This invention relates to the flocculation and clarification of finely-divided small particles. Flocculating agents for use in the flocculation of both organic solids (as, for example, in the treatment of sewerage) and inorganic solids (as, for example, clay suspensions, coal-washing waters, and other suspensions of finely-divided solids in water encountered in various industrial operations) have been the subject of considerable research in recent years. More particularly, various water-soluble organic polymers, for example those disclosed in U.S. Patent 3,240,721 Fordyce and U.S. Patent 3,275,580 to Garms, have been introduced as flocculants for use on water-dispersions and generally have proved to be highly useful. However, there appears to be no polymeric flocculant which has universal utility. Thus, work has continued in an attempt to discover various additional and versatile flocculating agents which can provide particular advantage in various applications.

SUMMARY OF THE INVENTION

Therefore, it is an object of the present invention to provide novel flocculating agents generally useful in the clarification of aqueous suspensions of both organic and inorganic solids.

Other objects of the invention will be obvious to those skilled in the art from a reading of the instant specification.

These objects have been substantially attained by the synthesis of polymeric flocculants formed by the condensation, with a polyamine of an organophosphate compound of the formula

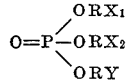

wherein R is a alkylene group, $X_1$ and $X_2$ are halogen atoms, and Y is selected from hydrogen and the halogens.

The alkylene group R is usually of from two to twelve carbon atoms, but, for imparting the most advantageous solubility characteristics to the finished product, R has from 1 to 6 carbon atoms. The preferred halogens are chlorine and bromine. Among the most useful organophosphate reactants are tris β-bromoethyl phosphate and
tris β-chloroethyl phosphate.

Polyamines useful for condensation with the aforesaid halogenated comprise generally those of the formula

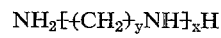

wherein $x$ has an average value of from 1 to 6, $y$ is an integer from 2 to 8.

The polyamine used may consist of ethylenediamine, diethylenetriamine, etc., propylenediamine, dipropylenetriamine, etc., (tetramethylene) diamine, di(tetramethylene) triamine, etc., (pentamethylene) diamine, di(pentamethylene) triamine, etc., corresponding poly(hexamethylene) polyamines, corresponding poly(heptamethylene) polyamines, and corresponding poly(octamethylene) polyamines. A single polyamine or a mixture of polyamines may be used. For example, when poly(hexamethylene) polyamine is used, it may consist of di(hexamethylene) triamine, tri(hexamethylene) tetraamine, tetra(hexamethylene) pentaamine, penta(hexamethylene) hexamine, hexa(hexamethylene) heptaamine, or mixtures thereof in the desired amounts. The starting polyamine may be a technical grade which is commercially available. It may contain a major proportion of one of such polyamines especially the di(hexamethylene) triamine with lesser amounts of the other polyamines mentioned.

The polyamine and phosphorous-bearing condensing agent are suitably reacted in an aqueous medium at temperatures of about 80 to 100° C. Higher reaction temperatures can be used but they are usually not manipulatively expedient because control of the desired end point of the condensation reaction becomes excessively difficult and relatively insoluble gels are often formed. Lower temperatures can also be used, but reaction time became excessively long and there appears to be no compensating advantage achieved by use of such lower temperatures.

The condensation polymers of the invention advantageously have average molecular weights above about 5000, and conveniently from 5000 to 12,000. However, polymers as low as 1000 molecular weight are highly effective in some applications.

In use, the condensation polymers are advantageously shipped in a stabilized aqueous solution of about 20 to 60% polymer and at a pH level of from 3 to 6.5.

The following working example is presented for the purpose of illustrating the process of the invention, the novel products which are produced thereby and illustrating also a particularly advantageous utility of the process. Various changes in reactants and reaction conditions can be made in accordance with the teachings of this specification.

Example 1

A mixture of 72 grams of a technical grade of a poly (hexamethylene) polyamine having an $x$ value according to the above formulae of about 2.7, and containing (a) about 50 weight percent of bis (hexamethylene) triamine, (b) about 35% of higher molecular weight polyamines of the formula in which the $x$ value is 3 or higher, and (c) about 15% of a mixture of lower molecular weight amines, nitriles, and lactams was added to 129.4 grams of water and heated to about 95° C. To this heated polyamine mixture was added, with stirring, 50 grams of tris β-chloroethyl phosphate. This addition of the phosphate was carried out dropwise over about a one-hour period. Thereafter the resulting reaction mixture was maintained at 95° C. until a viscosity of 1480 cps. (as measured at 75° C. with a Brookfield LVT viscometer and a No. 2 spindle at 30 r.p.m.) was attained.

This reaction mixture was then diluted with water to a solids content of about 30%. The resultant mixture had a viscosity of 150 cps. as measured at 50° C. The mixture was then bodied at 95° C. until the viscosity of a 30%-solids solution was 350 cps. at 50° C. This material was further diluted to 20% solids by addition of water and enough phosphoric acid to attain a pH level of 4.0.

The flocculating effectiveness of the condensation polymer of the invention was demonstrated by measuring the decrease in optical density of filtrate obtained by adding a solution containing 0.01% by weight of tris β-chloroethylphosphate-poly-alkyleneamine condensation product to a paper furnish of the following composition:

|  | Dispersion vol., ml. | Percent solids |
|---|---|---|
| 80/20 bleached kraft hardwood/softwood pulp | 100 | 0.9 |
| Fortified sodium rosenate size | 1 | 0.36 |
| TiO₂ | 1 | 5 |
| Papermakers alum | 1 | 0.25 |

This furnish was filtered through eight layers of grade 90 cheese cloth. The filtrate was observed for optical density in a spectro-photometer (Spectron 20) at a 520 millimicron wave length. Optical densities of 0.31, 0.21 and 0.11 were obtained when 4.2, 612 and 10.5 ml. of the 0.1% solution of flocculating agent was added to the furnish. When the furnish was filtered in the same manner without use of a flocculating agent according to the invention, optical densities ranged from about 0.8 to 0.9.

What is claimed is:

1. A composition of matter suitable for use in water clarification and comprising a water-soluble condensation product of (1) an organophosphate compound of the formula

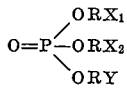

wherein R is an alkylene group, $X_1$ and $X_2$ are halogen and Y is halogen or hydrogen and (2) a polyamine of the formula

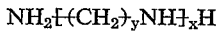

wherein $x$ has an average value of from 1 to 6 and $y$ is an integer from 2 to 8.

2. A composition of matter as defined in claim 1 wherein said average molecular weight of said condensation product is above about 5000.

3. A composition of matter as defined in claim 1 wherein said halogens are selected from bromide and chloride.

4. A composition of matter as defined in claim 1 where said organophosphate compound is tris β-(chloroethyl) phosphate.

5. A composition of matter as defined in claim 1 wherein said polyamine is bis(hexamethalene) triamine.

6. A process for making a water-clarification composition comprising condensing (1) an organophosphate compound of the formula

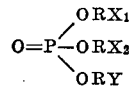

wherein R is an alkylene group, $X_1$ and $X_2$ are halogen and Y is halogen or hydrogen with (2) a polyamine of the formula

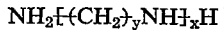

wherein $x$ has an average value of from 1 to 6 and $y$ is an integer from 2 to 8.

7. A process for clarifying aqueous suspensions of solid matter comprising mixing therewith an effective quantity of an aqueous dispersion of the reaction product of claim 1.

References Cited

UNITED STATES PATENTS 2,574,516  11/1951  Walter _____ 252—389 X

JOHN T. GOOLKASIAN, Primary Examiner

M. E. McCAMISH, Assistant Examiner

U.S. Cl. X.R.

21—2.7; 134—3; 210—58; 252—388, 390; 260—2